United States Patent
Yamaguchi

(10) Patent No.: US 7,393,509 B2
(45) Date of Patent: Jul. 1, 2008

(54) HONEYCOMB STRUCTURE

(75) Inventor: Shinji Yamaguchi, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 526 days.

(21) Appl. No.: 11/006,603

(22) Filed: Dec. 8, 2004

(65) Prior Publication Data
US 2005/0129907 A1  Jun. 16, 2005

(30) Foreign Application Priority Data
Dec. 11, 2003  (JP)  ............... 2003-412699

(51) Int. Cl.
*B01D 50/00* (2006.01)
*F01N 3/00* (2006.01)

(52) U.S. Cl. ............ 422/177; 422/168; 422/169; 422/170; 422/171; 422/172; 422/178; 422/179; 422/180; 422/182; 422/183; 60/274; 60/288; 60/297; 55/284

(58) Field of Classification Search ............... 422/177, 422/171, 172, 173, 176, 178, 180, 211, 168, 422/169, 210, 222; 55/284, 523; 60/274, 60/288, 297, 301; 48/128
See application file for complete search history.

(56) References Cited

U.S. PATENT DOCUMENTS

| 4,283,210 | A | 8/1981 | Mochida et al. | |
| 7,153,336 | B2* | 12/2006 | Itoh et al. | 55/523 |
| 2002/0178707 | A1* | 12/2002 | Vance et al. | 55/523 |
| 2003/0093982 | A1 | 5/2003 | Suwabe et al. | |
| 2003/0165662 | A1* | 9/2003 | Suwabe et al. | 428/116 |
| 2003/0167755 | A1* | 9/2003 | Nakatani et al. | 60/288 |
| 2004/0131772 | A1* | 7/2004 | Yamada et al. | 427/230 |
| 2004/0172929 | A1* | 9/2004 | Itoh et al. | 55/523 |
| 2004/0239011 | A1* | 12/2004 | Ishihara | 264/628 |
| 2006/0029769 | A1* | 2/2006 | Ichikawa et al. | 428/116 |

FOREIGN PATENT DOCUMENTS

| EP | 1 418 032 A2 | 5/2004 |
| JP | U-60-108709 | 7/1985 |
| JP | A-61-136413 | 6/1986 |
| JP | A 63-024731 | 2/1988 |
| JP | U 3012167 | 4/1995 |
| JP | 2002-309922 A | 10/2002 |
| JP | A-2003-49631 | 2/2003 |
| JP | A-2003-120261 | 4/2003 |
| JP | A 2003-236322 | 8/2003 |
| WO | WO 94/22556 A1 | 10/1994 |
| WO | WO 03/014538 A1 | 2/2003 |
| WO | WO 03/014545 A1 | 2/2003 |

* cited by examiner

*Primary Examiner*—Walter D. Griffin
*Assistant Examiner*—Huy-Tram Nguyen
(74) *Attorney, Agent, or Firm*—Oliff & Berridge, PLC

(57) ABSTRACT

The present invention provides a honeycomb structure 1 comprising partition walls 2 so as to form a plurality of cells 3 extending from one end face 42 to the other end face 44, and a plug portion 4 plugging the cell 3 at the end face 42 and/or 44. In the honeycomb structure 1, the plug portion 4 has a hollow and convex shape, and at least a part of the plug portion 4 is protruding from the end face.

20 Claims, 6 Drawing Sheets

AXIAL DIRECTION

HONEYCOMB STRUCTURE

BACKGROUND OF THE INVENTION

1. Field of the Invention

The present invention relates to a honeycomb structure having a plug portion suitably used as a filter, especially to a honeycomb structure suitable for a filter removing particulate matter (hereinafter referred to as PM) emitted from a diesel engine (hereinafter the filter is referred to as DPF).

2. Description of the Related Art

The need to remove harmful substance in exhaust gas from an internal combustion engine, a boiler and the like is increasing in consideration of environmental problem. Especially, regulations for removing PM has become stricter in Europe, the United States and Japan. Thus use of a honeycomb structure as a DPF is broadening.

For the honeycomb structure used as such a filter, as shown in, for example FIGS. 6(a) to 6(c), it is known that a honeycomb structure 1 having porous partition walls 2 disposed so as to form cells 3 extending from one end face to the other end face, and a plug portion 4 disposed so as to plug the cell 3 at either end face. By such a configuration, fluid to be treated which flows into the cells from one end face 42 passes through the porous partition walls, and is discharged from the other end face 44 via other cells 3. At this time, the partition walls 2 trap PM functioning as filters.

When the above-mentioned honeycomb structure is used as a DPF, substance such as PM is heavily deposited on the end face of the cell to reduce an inflow area at an opening of the cell or to clog the opening. As a result, a pressure loss increases to cause deterioration of power and fuel efficiency of a diesel engine.

In particular, diesel engine emissions contain soluble organic fraction (hereinafter referred to as SOF) that is viscous substance. As the SOF adheres to the end face having openings, followed by the adhesion and deposition of other components on the SOF, the openings are reduced or clogged in inflow area, and this results in an increased pressure loss.

In using a honeycomb structure with plug portions as a DPF, the following plugged honeycomb structure is proposed. That is, the honeycomb structure, wherein the plug portion has a protruding portion protruding from the end face such that the portion tapers off toward the upstream side in order to prevent increased pressure loss due to the deposition of PM (see, e.g., JP-A-63-24731 and US2003/0093982). Although such a structure is effective in suppressing the deposition of non-viscous substances on the end face, the honeycomb structure having the plug portion as described above fails to sufficiently suppress the deposition of substances on the end face if viscous substances are contained in the gas.

Another structure proposed has partition walls deformed and bent so that the partition walls are joined together at the end of square cell passages to block the outlets of the cell passages (see, e.g., JP-B-3012167). Although such a structure is effective in suppressing the clogging, the deformed and bent portions are difficult to form. Further, a structure that could offer a further enhanced strength in the deformed and bent portions is desired.

SUMMARY OF THE INVENTION

The present invention is for providing a honeycomb structure capable of inhibiting the increase in deposits on the end face and inhibiting the clogging at the opening even if viscous substances are contained in a fluid to be treated.

According to the present invention, there is provided a honeycomb structure comprising: partition walls disposed so as to form cells extending from one end face to the other end face; and a plug portion plugging the cell at the end face, wherein the plug portion has a hollow and convex shape, and at least a part of the plug portion is protruding from the end face.

In the present invention, it is preferable that a porosity of the plug portion be 50% or more, and preferable that at least a part of a hollow portion formed by the plug portion be in the position protruding from the end face. It is also preferable that at least a part of an outer surface of the plug portion be denser than inner part of the plug portion, and preferable that a ratio of (A) a height from the end face to a top of the plug portion to (B) a width of the plug portion (A/B) be 0.5 or more. It is also preferable that the honeycomb structure comprise a catalyst loaded on the plug portion.

According to the present invention, deposition of PM and the like can be inhibited, because the plug portion has a hollow and convex shape, and at least a part of the plug portion is protruding from the end face.

DESCRIPTION OF REFERENCE NUMERALS

Figure 1A:
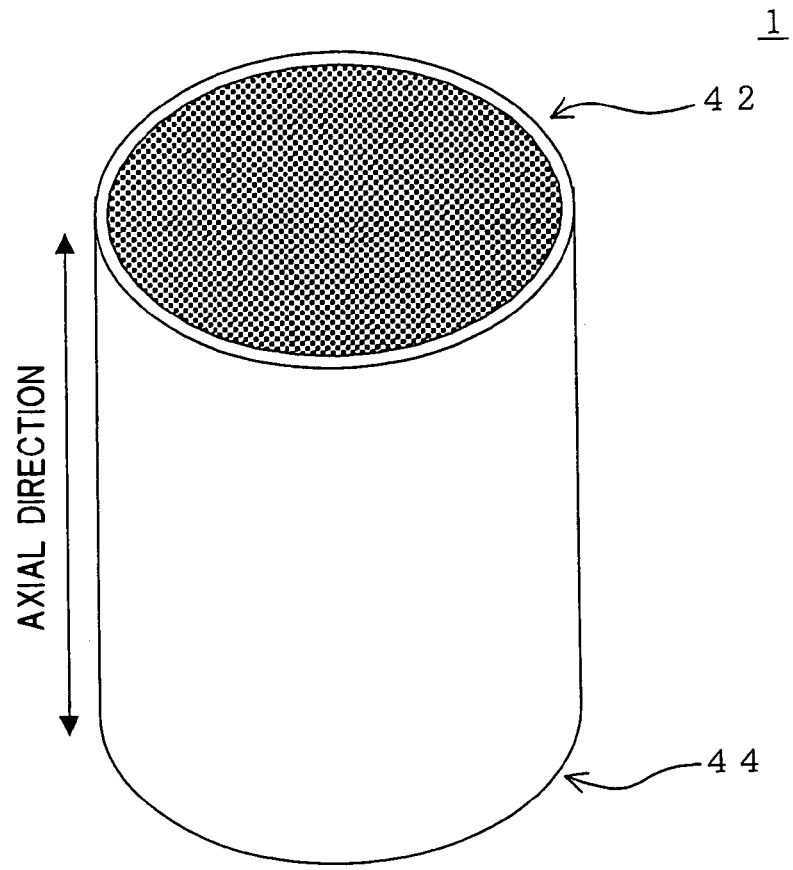
FIG. 1(a) is a schematic perspective view showing one embodiment of a honeycomb structure of the present invention.

In the drawings, each reference numeral designates the following part;

1: Honeycomb Structure, 2: Partition wall, 3: Cell, 4: Plug Portion, 5: Hollow Portion, 10: Mold, 42 and 44: End Face.

DESCRIPTION OF THE PREFERRED EMBODIMENTS

A honeycomb structure according to the present invention is described below in detail with reference to the concrete embodiments. However, the present invention is not restricted to the following embodiments. It is to be noted that in the following a section means a vertical section with respect to an axial direction (e.g. the axial direction in FIG. 1(a)) unless otherwise specified.

Figure 1B:
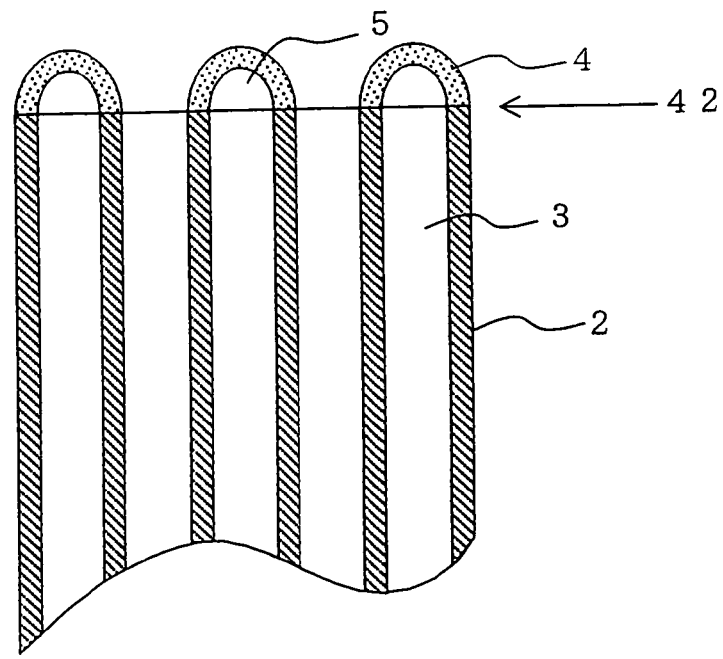
FIG. 1(b) is a partially enlarged view showing a part of a section parallel to the axial direction of FIG. 1(a)

FIG. 1(a) is a schematic perspective view showing one embodiment of a honeycomb structure of the present invention, and FIG. 1(b) is a partially enlarged view showing a part of a section parallel to the axial direction of FIG. 1(a). The honeycomb structure shown in FIGS. 1(a) and 1(b) has partition walls 2 disposed so as to form cells 3 extending from one end face 42 to the other end face 44. The honeycomb structure further has a plug portion plugging the cell 3 at one end face 42. The plug portion 4 has a hollow and convex shape, and a part of the plug portion 4 is protruding from the end face 42.

The plug portion in a hollow and convex shape inhibits the deposition of PM and other substances on the plug portion 4 and renders the clogging caused by the bridging of deposits less likely to occur by the flow straitening effect that gives a smooth flow of the fluid to be treated on the end face 42. Further, the hollow and convex shape reduces the heat capacity of the plug portion 4 and improves the heat-up rate of the plug portion 4. For this reason, even if viscous substance such as SOF adheres and deposits on the plug portion, the deposits can be burnt, and this can inhibit the increase in deposits. Further, the plug portion 4 protrudes from the end face 42 in the axial direction. This offers an excellent flow straitening effect as compared with the plug portion having the end level same as or concave relative to the end face.

The plug portion is preferably porous, and a porosity thereof is preferably 50% or more, more preferably 60% or more, particularly preferably 65% or more from the view point of reducing a heat capacity. On the other hand, too large a porosity is not preferable from the view point of strength and productivity. Thus, a porosity of the plug portion 4 is preferably 90% or less, more preferably 80% or less, particularly preferably 75% or less. Incidentally, an unit of a porosity is volume %.

Figure 2A:
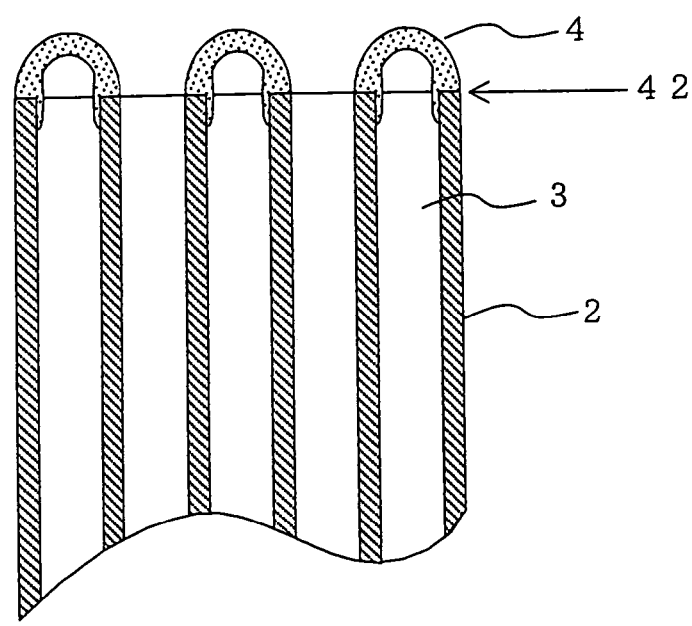
FIG. 2(a) is a schematic partially enlarged sectional view showing a part of a section parallel to the axial direction of another embodiment of a honeycomb structure of the present invention.
Figure 2B:
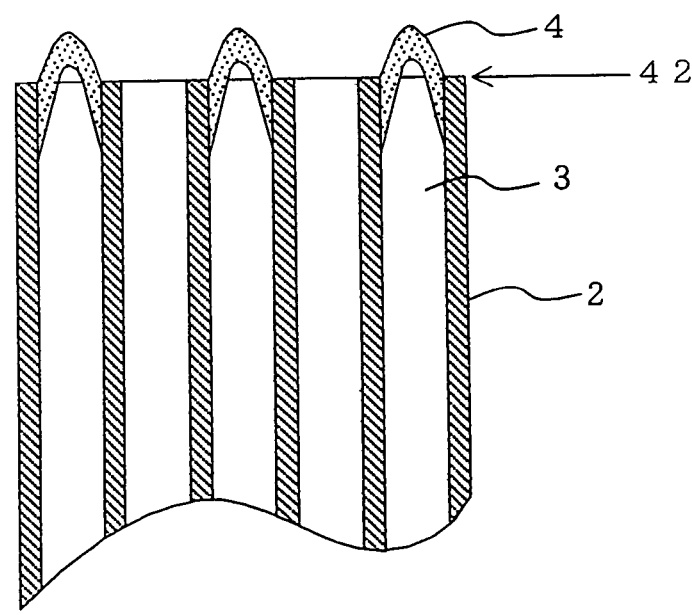
FIG. 2(b) is a schematic partially enlarged sectional view showing a part of a section parallel to the axial direction of still another embodiment of a honeycomb structure of the present invention.

Although the plug portion 4 preferably entirely protrudes from the end face 42 in the axial direction as shown in FIG. 1(b) from the viewpoint of the flow straitening effect, the plug portion 4 need not always be entirely outside the end face, and a part of the plug portion may remain inside the honeycomb structure relative to the end face 4 as shown in FIGS. 2(a) and 2(b).

The hollow and convex shape refers to a shape having a hollow portion 5 formed therein as shown in FIG. 1(b). The hollow portion 5 is preferably open in one direction, with the opening of the hollow portion 5 communicating with the cell. To reduce the heat capacity and enhance the flow straitening effect, at least a part of the hollow portion 5 is preferably positioned such that the hollow potion 5 protrudes relative to the end face 42 in the axial direction.

Figure 3A:
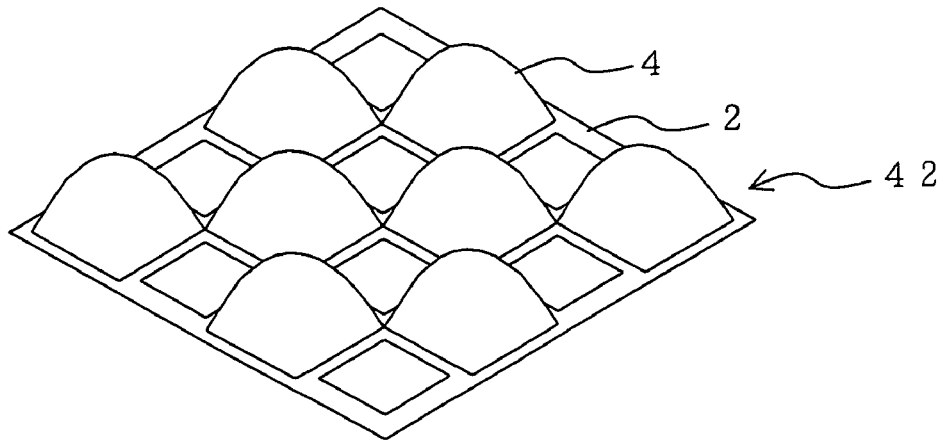
FIG. 3(a) is a schematic partially enlarged perspective view showing a part of an end face of still another embodiment of a honeycomb structure of the present invention.
Figure 3B:
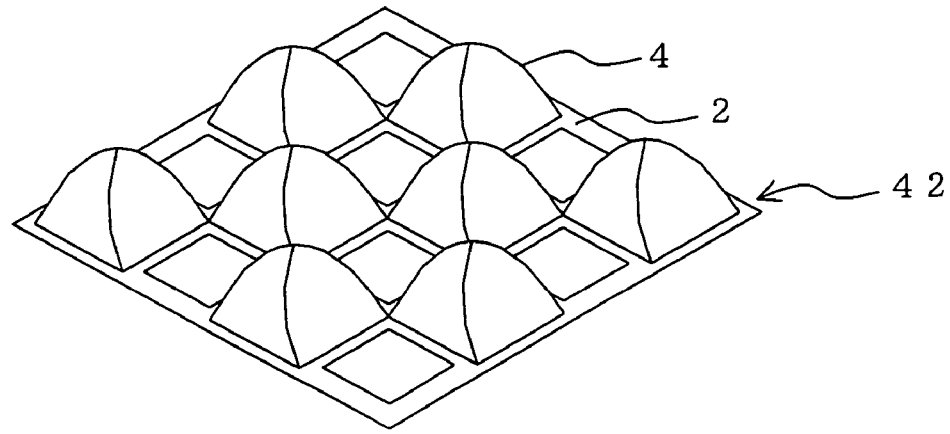
FIG. 3(b) is a schematic partially enlarged perspective view showing a part of an end face of still another embodiment of a honeycomb structure of the present invention.
Figure 3C:
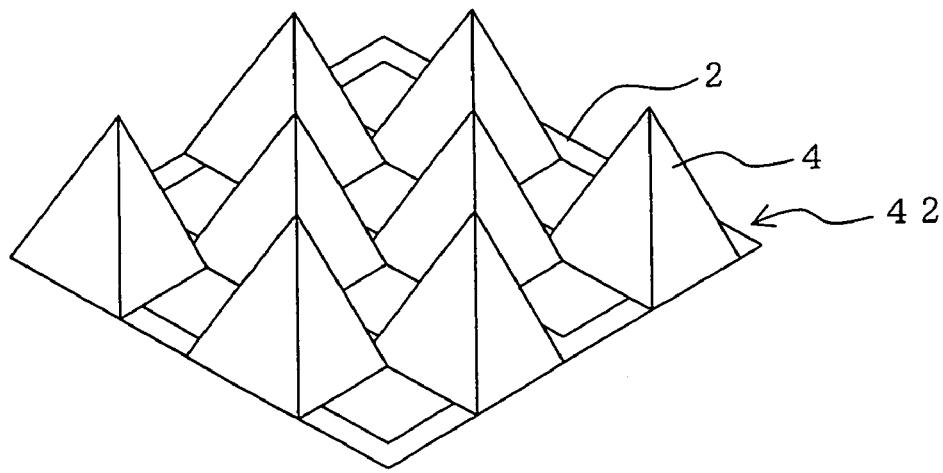
FIG. 3(c) is a schematic partially enlarged perspective view showing a part of an end face of still another embodiment of a honeycomb structure of the present invention.

There is no particular restriction as to an outer shape of the plug portion having a hollow and convex shape. Normally, the plug portion preferably has a bottom portion shaped similarly to the section of the cell, and tapers off toward the top. For instance, the plug portion is preferably in the form of a cup as shown in FIG. 3(a), a tent as shown in FIG. 3(b), or a pyramid as shown in FIG. 3(c). The plug portion is also preferably in the form of a cone, a semi-sphere, a semi-ellipsoid, or the like.

Figure 4:
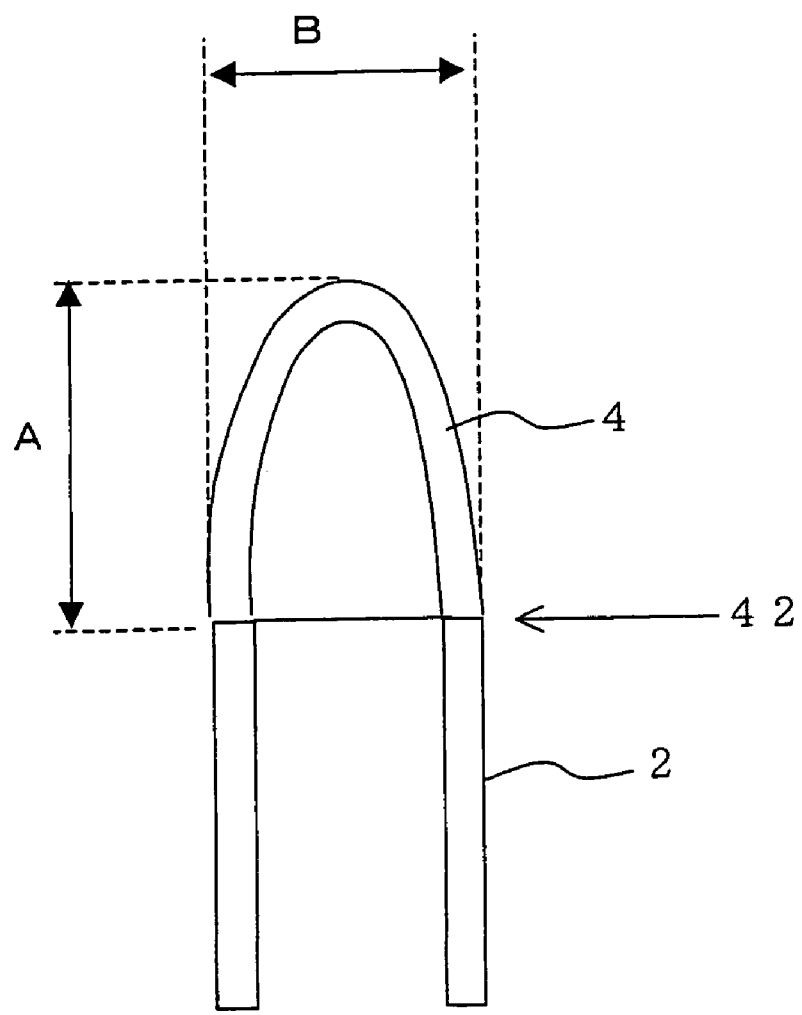
FIG. 4 is a schematic partially enlarged sectional view showing a part of a section parallel to the axial direction of still another embodiment of a honeycomb structure of the present invention.

The ratio (A/B) of a height (A) from the end face 42 to the top of the plug portion 4 to a width (B) of the plug portion is preferably large as shown in FIG. 4, because the larger the ratio, the easier it is for particles on the plug portion to enter the cell by flow straitening effect. This height/width ratio (A/B) is preferably 0.5 or more, further preferably 1 or more, and particularly preferably 2 or more.

It is preferable that the outer surface of the plug portion 4 be at least partially and preferably entirely made denser than the inside of the plug portion. When the outer surface is made denser, the adhesion of particles on the outer surface may be reduced to reduce the deposition of particles. The term "outer surface is made denser" means that the area of an open pore on the externally exposed surface, i.e., the surface opposite to that forming the hollow portion, is made smaller than the area of an open pore on a given section of the plug portion. To make the outer surface denser, the surface of the plug portion may be coated with fine particles of a material such as cordierite, silica and alumina. Alternatively, the surface of the plug portion may be thermally sprayed with a Ti- or W-based hard material.

To effectively inhibit the deposition of particles such as PM on the plug portion, the deposited PM and other particles are preferably burnt. Although the plug portion in a hollow and convex shape is effective in increasing heat-up rate and promoting the combustion of the deposited particles due to the small heat capacity, a catalyst is preferably loaded on the plug portion to further promote the combustion. Loading of a catalyst having a capability to promote the combustion on the plug portion having a hollow and convex shape allows the catalyst to quickly reach the activation temperature, further accelerating the combustion. In particular, loading of the catalyst on the outer surface and/or in the open pore of the plug portion makes it more likely for the combustion to take place at the interface between the plug portion and the deposited substance. As a result, the adhesive strength between the plug portion and the deposited substance weakens. This weaker adhesive strength coupled with the shape factor, that is, the convex shape, allows the deposited substance to easily fall off and enter the honeycomb structure. Further, heat is generated as a result of the combustion taking place on the plug portion. As this heat is transferred into the honeycomb structure, the combustion of the substance such as PM deposited inside the honeycomb structure is promoted. In particular, the area near the inflow portion of the fluid to be treated does not readily rise in temperature. Therefore, bringing about the combustion on the plug portion provided in the inflow portion is preferable also from the viewpoint that the temperature of this portion can be raised.

As to the catalyst, there is mentioned metal having a catalytic activity. The examples include noble metals such as Pt, Pd, Rh, nonmetals such as perovskite type catalyst and the like. It is preferable to load at least one of them on the plug portion.

While the aforementioned plug portion may be provided on either of the end faces of the honeycomb structure, the plug portion may also be provided on the both end faces. It is preferable that the plug portion as described above be provided on the end face subjected to the inflow of the fluid to be treated and that the conventional plug portion as shown in FIG. 6(c) be provided on the outflow end face. The effect of the present invention can be obtained even if not all of the plug portions provided on one end face are those as described above. The aforementioned plug portion may be present with the conventional plug portion. The percentage of the aforementioned plug portions on one end face is preferably 5% or more, further preferably 20% or more, and particularly preferably 80% or more.

There is no restriction as to a shape of a honeycomb structure of the present invention. A sectional shape of the honeycomb structure may be determined to any shape, for example, a circle, an ellipse, a race-track, a tetragon according to application or installation location. There is no particular restriction as to a sectional shape of the cell. The shape is preferably triangle, tetragonal or hexagonal.

There is no particular restriction as to a cell density, and it may be, for example, 6 to 2000 cells/in.$^2$ (0.9 to 311 cells/cm$^2$), preferably 50 to 1000 cells/in.$^2$ (7.8 to 155 cells/cm$^2$). There is no particular restriction as to the thickness of the partition wall, and the thickness may be in a range of, for example, 30 to 2000 μm, preferably 40 to 1000 μm, more preferably 50 to 750 μm. On the other hand, the plug portions are preferably arranged such that the cells, adjacent to each other with a partition wall therebetween, are plugged at the end portions opposite to each other. The plug portions are preferably arranged such that the end faces each form a checkered pattern.

In a honeycomb structure of the present invention, the partition wall is preferably porous. In this case, while the porosity of the partition wall is not specifically restricted, the preferred porosity in the case of use of the honeycomb structure 1 as a DPF is preferably 20% or more, more preferably 40% or more, and further preferably 60% or more. On the other hand, thinning the thickness of the partition wall 2 to a proper degree and reducing the cell density, that is, to increase a hydraulic diameter of the cell passage, and increasing the porosity, are also preferred from the viewpoint of reducing the initial pressure loss. For example, it is preferable that the thickness of the partition wall 2 be 1.5 mm or less, more preferably 1 mm or less, and further preferably 0.5 mm or less, that the cell density be 300 cells/in.$^2$, more preferably 200 cells/in.$^2$, and further preferably 100 cells/in.$^2$, and that the porosity be 50% or more, more preferably 60% or more, and further preferably 70% or more. On the other hand, an excessively large porosity can result in an insufficient strength. Therefore, the porosity is preferably 90% or less. Further, thinning the thickness of the partition wall 2 and reducing the porosity are also preferred from the viewpoint of reducing the initial pressure loss while at the same time securing heat resistance and strength of the partition wall. For example, it is also preferable that the thickness of the partition wall 2 be 0.4 mm or less, more preferably 0.3 mm or less, and further preferably 0.2 mm or less and that the porosity be 60% or less, more preferably 50% or less, and further preferably 40% or less. It is also preferable that the similar catalyst as that loaded on the plug portion be loaded on the partition wall and/or the outer wall.

Further, if the honeycomb structure of the present invention is used, for example, as a filter having a catalyst loaded on the honeycomb structure to continuously burn PM and other substances, the porosity is preferably in the range of 30 to 90%, more preferably in the range of 50 to 80%, and particularly preferably in the range of 50 to 75%. On the other hand, if the honeycomb structure is used as a filter for exhaust gas containing a catalyst having a capability to promote the combustion of particulate matter, the honeycomb structure should be formed with a dense and highly strong material so as to withstand a large thermal stress resulting from the combustion of particulate matter. The porosity of such a material is preferably 20 to 80%, further preferably 25 to 70%, and particularly preferably 30 to 60%.

The pore diameter in the porous partition wall is not specifically restricted and may be selected as appropriate to suit the application by those skilled in the art. The pore diameter can be generally selected based on the fluid viscosity and the target substance to be separated. For example, if the honeycomb structure 1 is used as a DPF, the mean pore diameter is preferably about 1 to 100 μm.

While the materials of the partition wall and the plug portion are not specifically restricted, the main component is preferably one of ceramics such as oxides and non-oxides, and metals. More specifically, mention may be made of cordierite, mullite, alumina, spinel, silicon carbide, silicon nitride, aluminum nitride, zirconia, lithium aluminum silicate and aluminum titanate for ceramics and Fe—Cr—Al-based metals and metal silicon for metals. It is preferable that at least one selected from among the above be used as the main component. Further, the main component is preferably at least one selected from among the group of alumina, mullite, zirconia, silicon carbide and silicon nitride from the viewpoint of high strength and high heat resistance. Silicon carbide or a composite material of silicon-silicon carbide is particularly suitable from the viewpoint of thermal conductivity and heat resistance. Adsorptive materials such as activated carbon, silica gel and zeolite are also among preferred materials of the partition wall 2. Here, it is meant that the "main component" constitutes 50% by mass or more, preferably 70% by mass or more, further preferably 80% by mass or more of the partition walls 2.

The partition wall and the plug portion may be made of the same or different materials. Since different functions are required of the partition wall and the plug portion, the materials are preferably selected to suit the required functions. Therefore, it is also preferable that the partition wall and the plug portion be made of different materials. On the other hand, even if the same material is used, the morphological characteristics such as the porosity and the pore diameter are preferably designed to suit the required functions. Therefore, it is also preferable that these morphological characteristics be different.

Figure 5A:
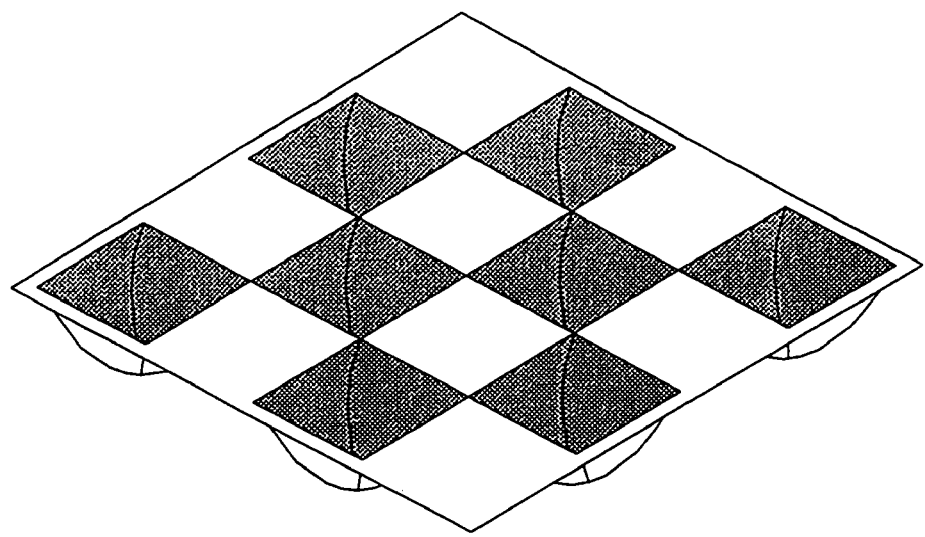
FIG. 5(a) is a schematic perspective view showing an embodiment of a mold operable to mold plug portions according to the present invention.
Figure 5B:
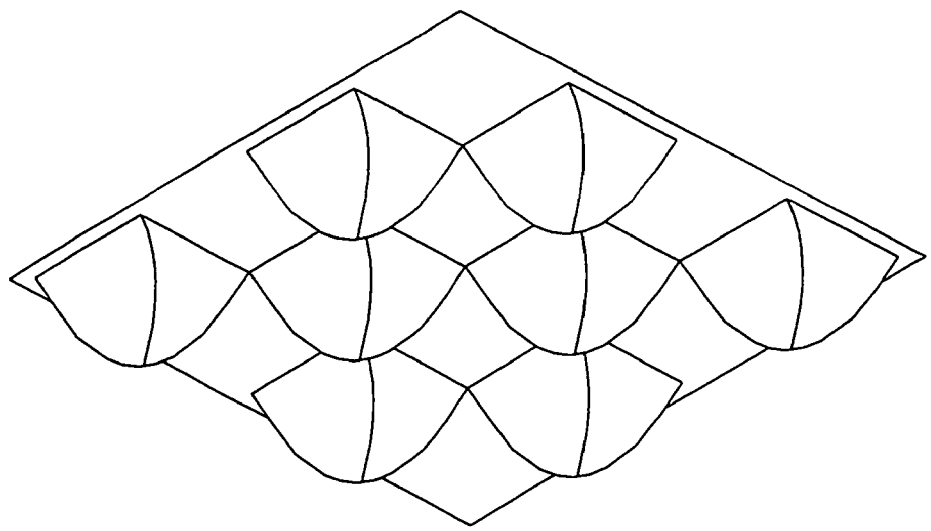
FIG. 5(b) is a schematic perspective view showing an embodiment of a mold operable to mold plug portions according to the present invention.

The method for producing the honeycomb structure mentioned above is described in more detail below with reference to the concrete embodiments. First, clay containing the raw material, i.e., the constituent material of the honeycomb structure other than the plug portion is prepared by normal method. Then, this clay is, for example, extruded into a honeycomb formed body. Next, slurry containing the raw material, i.e., the constituent material of the plug portion is prepared. This slurry is poured into a mold to prepare a molded body having hollow and convex shape. At this time, it is preferable that a mold 10 be used that can mold a plurality of the molded bodies each having a hollow and convex shape in one operation as shown in FIGS. 5(a) and 5(b). It is further preferable that the mold 10 be used that can mold the molded bodies each having a hollow and convex shape at the positions corresponding to the cells to be plugged. It is further preferable that the mold be used that can mold a plurality of molded bodies each having a hollow and convex shape in one operation at the positions corresponding to all the cells to be plugged at one end face of the honeycomb formed body.

Next, the molded bodies in the mold are aligned with the cells to be plugged of the honeycomb formed body to put together the both bodies. At this time, it is also preferable that an adhesive be used. To ensure correct and efficient alignment, an imaging device is preferably used to determine the positions of the bodies during alignment.

Next, the integrated body is fired. This provides a honeycomb structure having plug portions in a hollow and convex shape. It is to be noted that while the bodies before firing are put together by the aforementioned method, either or both of the bodies may be fired before putting together. If both are fired bodies, the bodies may be put together with only slight or even without any thermal treatment. As a result, the next firing process may become unnecessary.

EXAMPLES

The present invention will be described hereinafter in more detail based on examples. However, the present invention is not limited to these examples.

Example 1

A binder, a pore-forming material, a surfactant and water were added and mixed with the cordierite forming raw material. After the mixture was kneaded to prepare the clay, the extrusion and drying processes were carried out to obtain a honeycomb formed body in cylindrical form that is 144 mm in diameter and 15 mm in height with the square cells having the cell density of 300 cells/in.$^2$ (approx. 46 cells/cm$^2$) and the partition wall thickness of 12 mil (approx. 0.3 mm). On the other hand, the same raw material was used to prepare a slurry. The slurry was poured into a mold to prepare the molded bodies each having a hollow and convex shape as shown in FIG. 1(b). After drying of the molded bodies, the slurry of the cordierite forming raw material was applied to the bonding surfaces. After the both bodies were put together, the integrated body was fired to obtain a honeycomb structure having the porosity of 65% on the partition walls and the outer walls, the porosity of 50% on the plug portion and the A/B ratio of 0.5 on the plug portion.

Examples 2 to 5

The amounts of the pore-forming materials were adjusted so that the porosities on the plug portion would be equal to the values shown in Table 1. The honeycomb structures for Examples 2 to 5 were prepared in the same manner as in Example 1 except that the molds were used that would allow the height/width ratio (A/B) to be equal to the values shown in Table 1.

Comparative Example 1

Figure 6A:
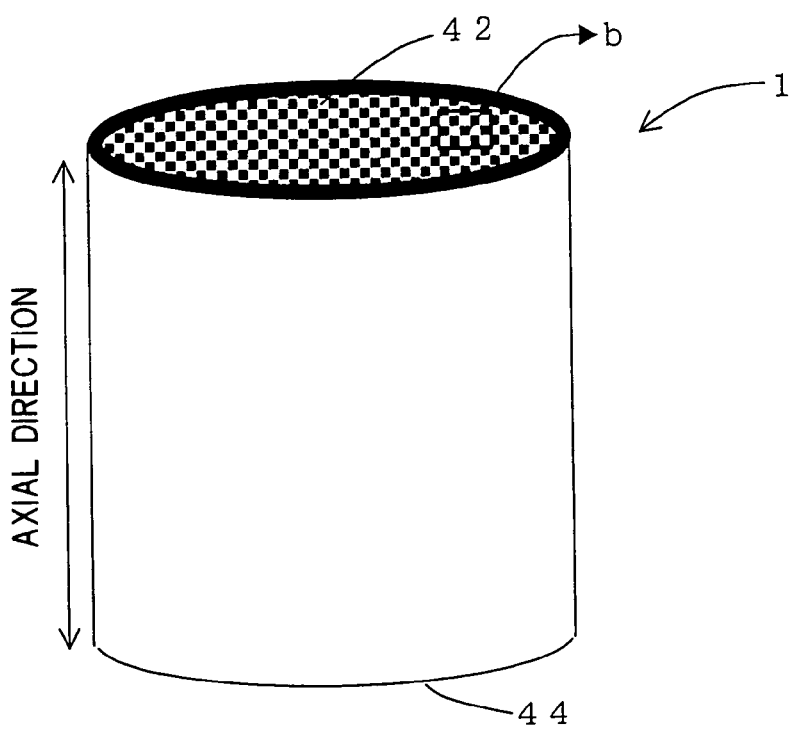
FIG. 6(a) is a schematic perspective view showing a conventional honeycomb structure.
Figure 6B:
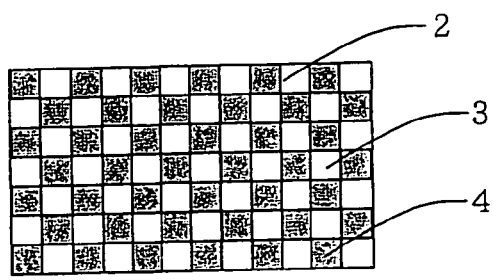
FIG. 6(b) is a schematic partially enlarged view showing a (b) part of FIG. 6(a)
Figure 6C:
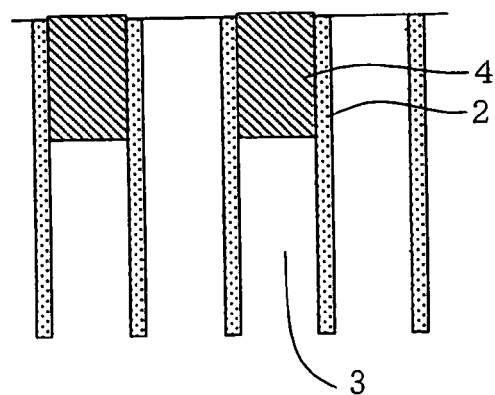
FIG. 6(c) is a schematic partially enlarged sectional view showing a part of section parallel to the axial direction of FIG. 6(a).

A honeycomb structure was prepared having the plug portion in a conventional shape with flat ends without any hollow portions, the end of the plug portion slightly protruding from the end face as shown in FIGS. 6(a) to 6(c). It is to be noted that this honeycomb structure was prepared so as to have the same construction as that for Example 1 except for the plug portion.

(Evaluation)
The obtained honeycomb structures were each installed in the exhaust line of a diesel engine. With the exhaust gas temperature set to 300° C., about 25 g of soot was produced and allowed to flow into the honeycomb structures. Then, the state of clogging with the soot at the inflow end face was visually observed for evaluation. The results are shown in Table 1. Table 1 shows that while the openings of the cells were observed to be narrower in the honeycomb structure obtained in Comparative Example 1 as a result of the deposition of the soot on the plug portion and the growth of the soot over the open cells, only a very small amount of the soot was observed on the plug portion in the honeycomb structures obtained in Examples 1 to 5.

TABLE 1

|  | Plug portion | | | Evaluation result amount of Soot deposition |
|---|---|---|---|---|
|  | Shape | Height/width ratio (A/B) | Porosity (%) |  |
| Example 1 | hollow and convex | 0.5 | 50 | very small |
| Example 2 | hollow and convex | 0.5 | 65 | Almost none |
| Example 3 | hollow and convex | 0.5 | 15 | Almost none |
| Example 4 | hollow and convex | 0.5 | 45 | very small |
| Example 5 | hollow and convex | 1 | 50 | Almost none |
| Comp. Example 1 | Flat | <0.3 | 45 | very large |

As described above, the honeycomb structure of the present invention can be suitably used as a filter, and in particular as a DPF, because this structure can inhibit the increase in deposits on the end face.

What is claimed is:

1. A honeycomb structure comprising:
    partition walls disposed so as to form open cells extending from an end face of the honeycomb structure to another end face of the honeycomb structure; and
    a plug portion plugging the open cell and bonded to the end face,
    wherein the plug portion has a hollow and convex shape, and at least a part of the plug portion is protruding from the end face, and
    wherein a cavity extends a distance from the cell plugged with the plug portion to an inside of the plug portion.

2. The honeycomb structure according to claim 1, wherein a porosity of the plug portion is 50% or more.

3. The honeycomb structure according to claim 1, wherein at least a part of a hollow portion formed by the plug portion is in the position protruding from the end face.

4. The honeycomb structure according to claim 1, wherein at least a part of an outer surface of the plug portion is denser than an inner part of the plug portion.

5. The honeycomb structure according to claim 1, wherein a ratio of (A) a height from the end face to a top of the plug portion to (B) a width of the plug portion (A/B) is 0.5 or more.

6. The honeycomb structure according to claim 1, wherein the honeycomb structure comprises a catalyst loaded on the plug portion.

7. The honeycomb structure according to claim 1, wherein the plug portion has a porosity of 60% or more.

8. The honeycomb structure according to claim 1, wherein the plug portion has a porosity of 65% or more.

9. The honeycomb structure according to claim 1, wherein the partition walls and the plug portions are made of different materials.

10. The honeycomb structure according to claim 1, wherein the plug portion has a porosity of 80% or less.

11. The honeycomb structure according to claim 1, wherein the plug potion has a porosity of 75% or less.

12. The honeycomb structure according to claim 1, wherein at least a part of the plug portion is within the honeycomb structure relative to the end face and the partition walls.

13. The honeycomb structure according to claim 1, wherein at least the part of the plug portion protruding from the end face has a convex shape in the form of at least one of a cup, a tent, a pyramid, a cone, a semi-sphere, and a semi-ellipsoid.

14. The honeycomb structure according to claim 1, wherein a ratio of (A) a height from the end face to a top of the plug portion to (B) a width of the plug portion (A/B) is 1 or more.

15. The honeycomb structure according to claim 1, wherein a ratio of (A) a height from the end face to a top of the plug portion to (B) a width of the plug portion (A/B) is 2 or more.

16. The honeycomb structure according to claim 1, wherein the partition walls are porous and have a porosity 20% or more.

17. The honeycomb structure according to claim 1, wherein the plug portion has an outer surface and an inner surface, the outer surface of the plug portion being entirely more dense than the inside surface of the plug portion.

18. The honeycomb structure according to claim 1, wherein the plug portion has an outer surface, the outer surface of the plug portion being coated with at least one of:
fine particles of cordierite;
fine particles of silica;
fine particles of alumina;
a Ti-based hard material; and
a W-based hard material.

19. The honeycomb structure according to claim 1, wherein the partition walls have a thickness in the range of 30 to 2000 µm.

20. The honeycomb structure according to claim 1, wherein the partition walls have a thickness of 1.55 mm or less, the partition walls have a porosity of 50% or more, and the honeycomb structure has a cell density of 300 cells/in.$^2$.

* * * * *